UNITED STATES PATENT OFFICE.

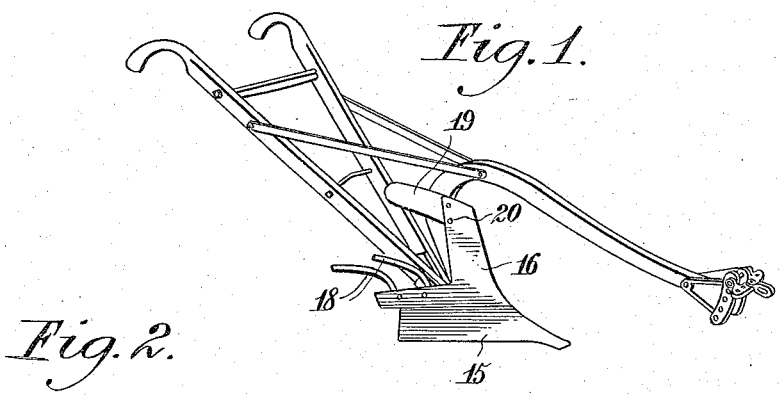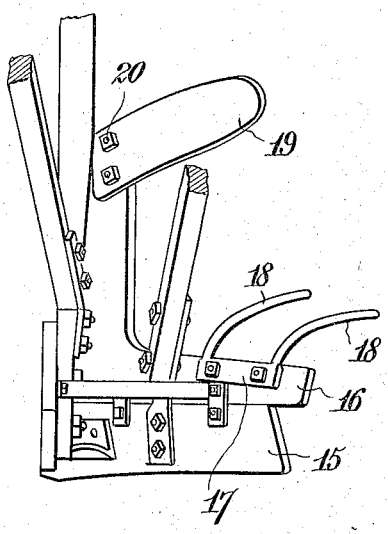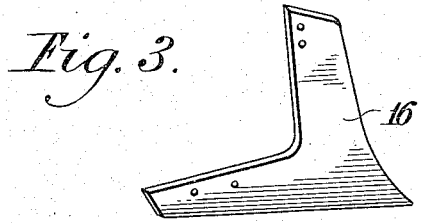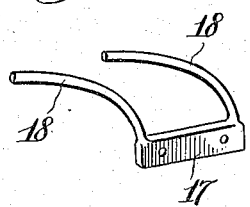

GEORGE F. BUTLER, OF JACKSONPORT, WISCONSIN.

PLOW.

1,153,025.  Specification of Letters Patent.  Patented Sept. 7, 1915.

Application filed January 20, 1914. Serial No. 813,291.

*To all whom it may concern:*

Be it known that I, GEORGE F. BUTLER, a citizen of the United States, residing at Jacksonport, in the county of Door and State of Wisconsin, have invented new and useful Improvements in Plows, of which the following is a specification.

This invention relates to plows, and it has particular reference to plows for deep tilling. When deep plowing is performed with a plow of ordinary construction, the entire slice is turned over and the soil which is brought to the surface is frequently less rich and desirable than the top soil, thus necessitating replowing in order that the best results may be attained.

The invention has for its object to provide a plow of improved construction whereby the bottom portion of the slice turned by the plow will be loosened and broken up in the process of plowing and sifted back into the furrow, only the upper or top portion of the slice being actually turned, thereby attaining all the beneficial results of deep plowing with none of the disadvantages.

A further object of the invention is to produce a simple and improved plow structure having an angular or recessed mold board provided with means for breaking up and pulverizing the bottom portion of the slice and permitting it to sift back into the furrow and other means whereby the top portion of the slice will be turned, thereby exposing that portion of the soil containing the rich humates and plant food.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing, Figure 1 is a perspective view of a plow constructed in accordance with the invention. Fig. 2 is a rear view of the same. Fig. 3 is a detail view showing the mold board detached. Fig. 4 is a detail view showing the sifting members detached. Fig. 5 is a detail view showing the furrow turning wing or leaf detached.

Corresponding parts in the several figures are denoted by like characters of reference.

The share 15 is of ordinary construction, but the mold board consists of an angular member 16 which in the drawing has been shown as being reversely L-shaped, the drawing illustrating a right hand plow, and it being understood that in a left hand plow the mold board will be substantially L-shaped. The mold board 16 is connected with the share 15 in any ordinary and well known manner.

Secured on the rear face of the base of the mold board adjacent to the upper edge of said base is a plate or bar 17 having rearwardly extending fingers 18 of which any desired number may be used, and said fingers being curved or appropriately formed for the purpose in view. The plate or bar 17, together with the fingers 18, constitutes what may be termed a sifting member, the purpose of which is to break and pulverize a portion of the slice that is being turned by the plow and to permit the pulverized soil to drop back into the furrow. Similarly secured to the shank or upwardly extending portion of the mold board near the upper end thereof is a rearwardly extending wing 19, said wing being attached to the rear face of the shank of the mold board, and said wing extending upwardly and rearwardly and having a curvature which is found suitable to turn that portion of the slice which is not broken up and sifted back into the furrow.

For the purpose of assembling the sifting member, as well as the wing, with the mold board, bolts or other suitable fastening means may be utilized, as indicated at 20. It is desired to be understood that the dimensions of the wing 19, the number of sifting teeth employed and the curvature of the several parts may be varied to produce the best results according to the nature of the soil that is to be operated upon.

It will be readily understood that in the use of this improved plow the soil may be tilled to any desired depth, deep plowing being necessary especially in dry regions where it is highly important that the water precipitated be conserved to the utmost. It is well known, however, that in ordinary deep plowing where the entire slice is turned, the soil conditions are frequently such that an undesirable stratum of the soil will be exposed when the entire slice is turned. Replowing is thus frequently rendered necessary in order to expose a suitable seed bed. By the present improvement the soil may be tilled as deep as may be desired, and the sifting fingers may be arranged and proportioned in such a manner as to cause any desired proportion of the slice to be broken up and pulverized and permitted to sift between said fingers into the bottom of the furrow before the remaining portion of the slice is turned over. The rich portion of the soil will thus be exposed to form a seed bed, and the subjacent stratum will be broken up and rendered thoroughly porous being thus placed in a fit condition to absorb and retain moisture, thus insuring the best possible crop results.

Having thus described the invention, what is claimed as new, is:—

In a plow having a beam, a standard and share of ordinary construction, an angular substantially L-shaped mold board mounted above and adjacent to the share and comprising a base portion and an upwardly extending shank portion, in combination with a sifting member consisting of a plate secured on the rear face of the base portion and having rearwardly extending fingers, and a wing secured on the rear face of the upwardly extending shank portion, said wing extending laterally above the fingers of the sifting member.

In testimony whereof I affix my signature in presence of two witnesses.

GEORGE F. BUTLER.

Witnesses:
A. W. LAURENCE,
G. C. DANA.

Copies of this patent may be obtained for five cents each, by addressing the "Commissioner of Patents. Washington, D. C."